(12) United States Patent
Uchino

(10) Patent No.: US 7,248,205 B2
(45) Date of Patent: Jul. 24, 2007

(54) RADAR APPARATUS

(75) Inventor: Masaharu Uchino, Aiko-gun (JP)

(73) Assignees: Anritsu Corporation, Atsugi-shi (JP); Matsushita Electric Industrial Co., Ltd., Kadoma-shi (JP)

(*) Notice: Subject to any disclaimer, the term of this patent is extended or adjusted under 35 U.S.C. 154(b) by 135 days.

(21) Appl. No.: 10/548,400

(22) PCT Filed: Feb. 4, 2005

(86) PCT No.: PCT/JP2005/001657

§ 371 (c)(1),
(2), (4) Date: Sep. 8, 2005

(87) PCT Pub. No.: WO2005/076035

PCT Pub. Date: Aug. 18, 2005

(65) Prior Publication Data

US 2006/0187111 A1  Aug. 24, 2006

(30) Foreign Application Priority Data

Feb. 9, 2004  (JP) ............................ 2004-032614

(51) Int. Cl.
*G01S 13/28* (2006.01)
*G01S 13/42* (2006.01)

(52) U.S. Cl. .................. 342/70; 342/108; 342/84; 342/85; 342/91; 342/92; 342/189; 342/194; 342/195; 342/132; 342/135

(58) Field of Classification Search ........... 342/70–72, 342/82–85, 91, 92, 108, 128–135, 189, 194, 342/195, 24

See application file for complete search history.

(56) References Cited

U.S. PATENT DOCUMENTS 3,562,750 A * 2/1971 Fishbein et al. ............ 342/109

(Continued)

FOREIGN PATENT DOCUMENTS

JP  8-194062 A  7/1996

(Continued)

OTHER PUBLICATIONS

Notification Concerning Transmittal of Copy of International Preliminary Report on Patentability, Chapter I of the Patent Cooperation Treaty, and Written Opinion of the International Searching Authority, for PCT/JP2005/001657, 5 sheets.

(Continued)

*Primary Examiner*—John B. Sotomayor
(74) *Attorney, Agent, or Firm*—Frishauf, Holtz, Goodman & Chick, P.C.

(57) ABSTRACT

A transmitter emits into an intended search space a radar wave having a predetermined frequency pulse-modulated by a trigger pulse of a predetermined width. A receiver receives a reflected wave of the radar wave and outputs a receive signal. A local pulse generator outputs a local pulse signal having the predetermined frequency pulse-modulated by the trigger pulse delayed by the delay unit. A correlation value detector detects a strength correlation value between the receive signal and the local pulse signal. A delay time changing unit changes the delay time sequentially within a range of a predetermined period representing a generation period of the trigger pulse. A correlation value storage unit stores the strength correlation value detected for each delay time changed. A frequency distribution generator generates a frequency distribution of a stored correlation value against the delay time. A search control unit executes an analyzation for the intended search space based on a generated frequency distribution.

15 Claims, 10 Drawing Sheets

U.S. PATENT DOCUMENTS

| | | | |
|---|---|---|---|
| 3,680,105 A * | 7/1972 | Goldstone | 342/194 |
| 3,727,222 A * | 4/1973 | Hollis | 342/80 |
| 4,142,189 A * | 2/1979 | Gleason | 342/109 |
| 4,196,435 A * | 4/1980 | Phillips, Jr. | 342/201 |
| 4,521,778 A * | 6/1985 | Knepper | 342/134 |
| 6,122,602 A | 9/2000 | Michalski et al. | |
| 2006/0187111 A1 * | 8/2006 | Uchino | 342/70 |
| 2006/0220943 A1 * | 10/2006 | Schlick et al. | 342/70 |

FOREIGN PATENT DOCUMENTS

| | | |
|---|---|---|
| JP | 8-511341 A | 11/1996 |
| JP | 10-170574 A | 6/1998 |
| JP | 10-319111 A | 12/1998 |
| JP | 11-118906 A | 4/1999 |
| JP | 11-248771 A | 9/1999 |
| JP | 11-337600 A | 12/1999 |

OTHER PUBLICATIONS

M. Skolnik; Radar Handbook; Second Edition; 1990; pp. 1.2 to 1.6. McGraw-Hill Publishing Company, New York.

Enrico M. Staderini; An UWB Radar Based Stealthy "Lie Detector"; http://www.hrvcongress.org/second/first/placed_/Standerini_Art_Eng.pdf.

* cited by examiner

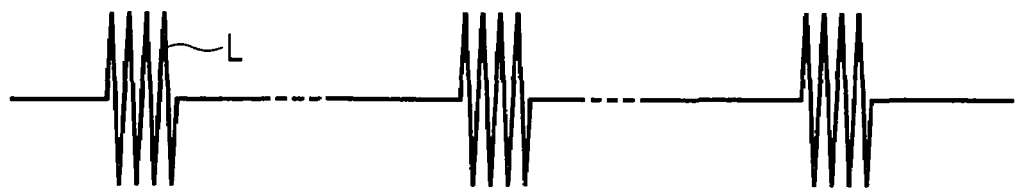
FIG. 3D
FIG. 3E
FIG. 3F
| | H(1,1)=0 | H(1,2)=0 | H(1,3)=0 |
FIG. 3G

RADAR APPARATUS

This application is a U.S. National Phase Application under 35 U.S.C. 371 of International Application PCT/JP2005/001657 filed Feb. 4, 2005.

TECHNICAL FIELD

The present invention relates to a radar device, and in particular to a short-range radar device for on-vehicle application, blind persons and medical purposes employing a technique capable of searching the surrounding environment with a high resolution.

BACKGROUND ART

In the prior art, a pulse radar device is used to search for the position (distance to and direction of the object), size and motion of an object existing around the user as a short-range radar device for on-vehicle application, blind persons and medical purposes.

FIG. 9 is a block diagram showing a configuration of the essential parts of a conventional pulse radar device 10.

Specifically, in the pulse radar device 10, a trigger pulse generator 11 generates a trigger pulse Pt of a predetermined width periodically and outputs it to a transmitter 12.

The transmitter 12 emits a radar wave P pulse-modulated by the trigger pulse Pt to an intended search space through a transmission antenna 12a.

A receiver 13 receives, through a receiving antenna 13a, the wave R reflected from an object 1 receiving the radar wave P. The receive signal Rr is detected by a detector 14 including a diode detection circuit and a detection signal D is output to a search control unit 15.

The search control unit 15, based on the detection signal D output from the detector 14 during a predetermined length of time from the timing of emission of the radar wave P, checks the presence or absence of an object in the intended search space and the distance thereof and outputs the result visually or aurally in a form that can be grasped by the observer.

In this case, though not shown, the gain of the receiver 13 is controlled by feeding back the detection signal D to the receiver 13.

The above-mentioned radar device for making the search with the trigger pulse Pt generated at predetermined time intervals T is disclosed in, for example, the non-patent document 1 described below.

Non-patent document 1: Merrill I. Skolnik "RADAR HANDBOOK" 2nd ed. 1990, pp. 1.2 to 1.6. Also, a short-range radar device for medical purposes is disclosed, for example, in the following non-patent document 2.

Non-patent document 2: http://www.hrvcongress.org/second/first/placed_3/Standerini_Art_Eng.pdf. The pulse radar device 10 described above and known for a long time includes a long-range radar device large in size and output which can search for a large object such as an airplane or a ship located at a remote place.

In recent years, however, a short-range radar device for personal use has been proposed to support the safe driving of automotive vehicles, protect visually-handicapped persons walking on the road or help monitor in-patients during the nighttime. As a frequency band dedicated to such a radar device, the assignment of a wide band (6 to 7 GHz) of 23 to 29 GHz called UWB (Ultra Wide Band) is being studied.

It is basically unavoidable that the personal short-range radar device interferes with other radar devices. The assignment of a wide band (6 to 7 GHz) as described above, however, can take advantage of the difference in transmission timing due to both the separation by frequency and a narrow pulse (1 nsec or less, for example), and thus can reduce the effect of interference to a level posing practically no problem.

The response rate of the diode detection circuit comprising the detector 14 described above, however, is at most about 100 nsec, and cannot correctly reflect the strength of the reflected wave R having a pulse as narrow as not more than 1 nsec as described above, thereby posing the problem that a high-resolution search with a radar wave having a narrow pulse width is impossible.

The strength of the reflected wave Rr which the radar device receives from the object 1 is inversely proportional to the fourth power of the distance to the object 1. In the case of a short-range radar device, therefore, a slight distance change-causes a sharp, large change of the input level of the reflected wave Rr. The conventional gain control method of the feedback type cannot follow this sharp change and may be unable to recognize the level of the reflected wave correctly.

DISCLOSURE OF INVENTION

Accordingly, it is an object of this invention to solve the aforementioned problems and provide a radar device capable of correctly searching the surrounding environment with a high resolution.

In order to achieve the above object, according to a first aspect of the present invention, there is provided a radar device comprising:

a trigger pulse generator (21) which generates a trigger pulse of a predetermined width at a predetermined period;

a transmitter (22) which emits into an intended search space a radar wave having a predetermined frequency pulse-modulated by the trigger pulse from the trigger pulse generator (21);

a receiver (23) which receives a reflected wave of the radar wave emitted by the transmitter (22) and outputs a receive signal;

a delay unit (24) which delays the trigger pulse from the trigger pulse generator (21) by a predetermined delay time;

a local pulse generator (25) which outputs a local pulse signal having the predetermined frequency pulse-modulated by the trigger pulse delayed by the predetermined delay time by the delay unit (24);

a correlation value detector (26) which determines a strength correlation value between the receive signal output from the receiver (23) and the local pulse signal output from the local pulse generator (25);

a delay time changing unit (30) which sequentially changes the predetermined delay time of the delay unit (24) within a range of the predetermined period representing a generation period of the trigger pulse generated by the trigger pulse generator (21);

a correlation value storage unit (31) which stores the strength correlation value detected by the correlation value detector (26) for each delay time changed by the delay time changing unit (30);

a frequency distribution generator (32) which generates a frequency distribution of the strength correlation value stored in the correlation value storage unit (31) with respect to the delay time; and a search control unit (35) which executes an analyzation for the intended search space based on the frequency distribution generated by the frequency distribution generator (32).

In order to achieve the above object, according to a second aspect of the present invention, there is provided a radar device according to the first aspect, wherein the receiver is configured to change a receiving gain against the reflected wave, the radar device further comprising a gain changing unit which variably controls the receiving gain of the receiver in accordance with the delay time changed by the delay time changing unit and suppresses a change in an output level of the receive signal due to a difference in the delay time.

In order to achieve the above object, according to a third aspect of the present invention, there is provided a radar device according to the first aspect, wherein the correction value detector (26) comprises:

a multiplication circuit (27) which multiplies the receive signal output from the receiver by the local pulse signal output from the local pulse generator, and an integration circuit (28) which integrates a multiplication output from the multiplication circuit (27).

In order to achieve the above object, according to a fourth aspect of the present invention, there is provided a radar device according to the third aspect, further comprising an analog-to-digital (A/D) converter (29) which converts an integration output from the integration circuit (28) from an analog to a digital signal, wherein the correlation value storage unit (31) stores the digital signal converted by the A/D converter (29) as the strength correlation value.

In order to achieve the above object, according to a fifth aspect of the present invention, there is provided a radar device according to the third aspect, wherein the integration circuit (28) is comprised of a Miller integrator.

In order to achieve the above object, according to a sixth aspect of the present invention, there is provided a radar device according to the first aspect, wherein the correlation value detector (26) comprises:

a 90-degree phase shifter (41) which divides the local pulse signal output from the local pulse generator (25) into two signals having 90 degrees of phase difference each other, a 0-degree distributor (42) which divides the receive signal output from the receiver (23) into two signals in phase with each other, first and second multiplication circuits (27A, 27B) which each multiplys the local pulse signal divided into the two signals having 90 degrees of phase difference each other by the 90-degree phase shifter (41), respectively, with the receive signal divided into the two signals in phase with each other by the 0-degree distributor (42), first and second integration circuits (28A, 28B) which each integrates multiplication outputs from the first and second multiplication circuits (27A, 27B), respectively, first and second A/D converters (29A, 29B) which each converts integration outputs form the first and second integration circuits (28A, 28B), respectively, from an analog to a digital signal, first and second square operators (43A, 43B) which each squares digital signals converted by the first and second A/D converters (29A, 29B), respectively, and an adder (44) which adds square operation results from the first and second square operators (43A, 43B) and outputs a result of addition as the strength correlation value, and the correlation value storage unit (31) stores the result of addition output as the strength correlation value from the adder (44).

In order to achieve the above object, according to a seventh aspect of the present invention, there is provided a radar device according to the sixth aspect, wherein the correlation value detector (26) further comprises a square rooter (45) which determines a square root of the result of addition from the adder (44) and outputs the square root as the strength correlation value, and the correlation value storage unit (31) stores the square root output as the strength correlation value from the square rooter (45).

In order to achieve the above object, according to an eighth aspect of the present invention, there is provided a radar device according to the first aspect, wherein the trigger pulse generator (21) generates a trigger pulse Pt having the predetermined width W of about 1 nsec for about 100 nsec at the predetermined period T and outputs the trigger pulse Pt to the transmitter (22) and the delay unit (24).

In order to achieve the above object, according to a ninth aspect of the present invention, there is provided a radar device according to the eighth aspect, wherein the transmitter (22) generates a radar wave of UWB (Ultra Wide Band) of 6 to 7 GHz in the frequency range of 23 to 29 GHz as a radar wave having the predetermined frequency pulse-modulated by the trigger pulse.

In order to achieve the above object, according to a tenth aspect of the present invention, there is provided a radar device according to the first aspect, wherein the receiver (23) comprises:

a variable-gain amplifier (23b) which receives and amplifies a reflected wave from an object (1) which is received the radar wave emitted by the transmitter (22) into the intended search space, and a bandpass filter (BPF) (23c) which limits a band of an amplified output from the variable-gain amplifier (23b) and outputs as the receive signal to the correlation value detector (26).

In order to achieve the above object, according to an eleventh aspect of the present invention, there is provided a radar device according to the first aspect, wherein the delay unit (24) is configured as a combination of delay means for coarse adjustment capable of changing the predetermined delay time in a large step based on a change instruction of the delay time changing unit (30) and delay means for fine adjustment capable of changing the delay time finely in the large step.

In order to achieve the above object, according to a twelfth aspect of the present invention, there is provided a radar device according to the eleventh aspect, wherein the delay means for coarse adjustment changes the predetermined delay time in steps of about 10 nsec, and the delay means for fine adjustment changes the predetermined delay time in steps of about 0.1 nsec.

In order to achieve the above object, according to a thirteenth aspect of the present invention, there is provided a radar device according to the first aspect, used as a short-range radar device for on-vehicle application.

In order to achieve the above object, according to a fourteenth aspect of the present invention, there is provided a radar device according to the first aspect, used as a short-range radar device for blind persons.

In order to achieve the above object, according to a fifteenth aspect of the present invention, there is provided a radar device according to the first aspect, used as a short-range radar device for medical purposes.

In the radar device according to the aforementioned aspects of the invention, the receive signal is multiplied with the local pulse signal pulse-modulated by a delayed trigger pulse and the multiplication output thereof is integrated to detect the strength correlation value of the two signals. At the same time, the delay time of the trigger pulse is sequentially changed to determine the strength correlation value for each delay time, and the frequency distribution of the strength correlation value against the delay time is generated. Based on this frequency distribution, the intended search space is analyzed.

Specifically, in the radar device according to the aforementioned aspects of the invention, unlike in the conventional radar device, the receive signal is not detected by a diode. Even a short-range radar device using a radar wave of a narrow pulse width, therefore, can grasp the strength of the reflected wave correctly from the frequency distribution of the strength correlation value against the delay time, thereby making a high-resolution search possible.

Also, in the radar device according to the aforementioned aspects of the invention, the receiving gain of the receiver against the reflected wave is variably controlled in accordance with the variable delay time thereby to suppress the level change of the receive signal with the difference in delay time.

As a result, the radar device according to the aforementioned aspects of the invention can prevent a signal of an excessively large level from being input to the correlation detection section and thus can detect the correlation value correctly within the proper operation range.

BRIEF DESCRIPTION OF DRAWINGS

FIG. 3D is a waveform diagram showing a local pulse signal L generated by a local pulse generator to explain the operation of the radar device of FIG. 1.

FIG. 3E is a waveform diagram showing a reflected wave R from an object to explain the operation of the radar device of FIG. 1.

FIG. 3F is a waveform diagram showing a receive signal Rr from the receiver to explain the operation of the radar device of FIG. 1.

FIG. 3G is a diagram showing a strength correlation value H output by a correlation value detector to explain the operation of the radar device of FIG. 1.

BEST MODE FOR CARRYING OUT THE INVENTION

Embodiments of the invention are explained below with reference to the drawings.

Figure 1:
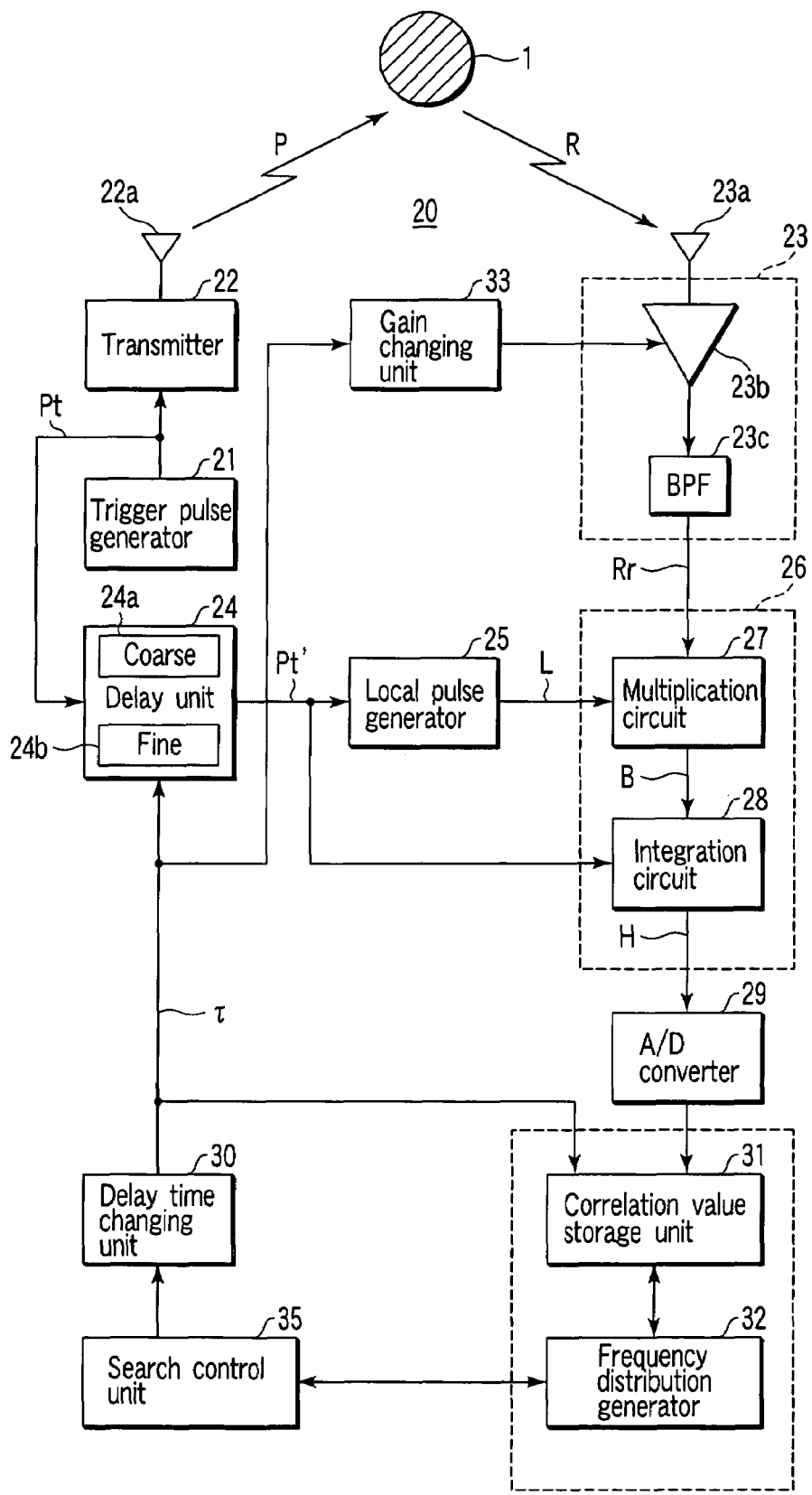
FIG. 1 is a block diagram showing a configuration of the radar device according to an embodiment of the invention.

FIG. 1 is a block diagram showing a configuration of a radar device 20 according to an embodiment of the invention used as a short-range radar device for on-vehicle application, blind persons and medical purposes.

The basic configuration of the radar device according to this invention, as shown in FIG. 1, comprises a trigger pulse generator 21 for generating trigger pulses of a predetermined width at predetermined time intervals, a transmitter 22 for emitting, into the intended search space, a radar wave having a predetermined frequency pulse-modulated by the trigger pulse from the trigger pulse generator 21, a receiver 23 for receiving a reflected wave of the radar wave emitted by the transmitter 22 and reflected and outputting a receive signal, a delay unit 24 for delaying the trigger pulse from the trigger pulse generator 21 for a predetermined delay time, a local pulse generator 25 for outputting a local pulse signal having the predetermined frequency pulse-modulated by the trigger pulse delayed for the predetermined delay time by the delay unit 24, a correlation value detector 26 for determining a strength correlation value between the receive signal output from the receiver 23 and the local pulse signal output from the local pulse generator 25, a delay time changing unit 30 for sequentially changing the predetermined delay time of the delay unit 24 within a range of the predetermined period representing a generation period of the trigger pulse generated by the trigger pulse generator 21, a correlation value storage unit 31 for storing the strength correlation value detected by the correlation value detector 26 for each delay time changed by the delay time changing unit 30, a frequency distribution generator 32 for generating a frequency distribution of the strength correlation value stored in the correlation value storage unit 31 with respect to the delay time, and a search control unit 35 for executing an analyzation for the intended search space, based on the frequency distribution generated by the frequency distribution generator 32.

Specifically, in FIG. 1, the trigger pulse generator 21 generates the trigger pulses Pt having a predetermined width W (1 nsec, for example) with a predetermined period T (100 nsec, for example) and outputs them to the transmitter 22 and the delay unit 24.

The transmitter 22 generates a search radar wave P having a wide band width of 6 to 7 GHz of UWB (Ultra Wide Band) in the frequency of 23 to 29 GHz, for example, as a predetermined frequency (carrier frequency) pulse-modulated by the trigger pulses Pt from the trigger pulse generator 21, and emits the radar wave P into the intended search space through a transmission antenna 22a.

The receiver 23 receives, through a receiving antenna 23a, a reflected wave R from an object 1 which has received the radar wave P emitted into the intended search space from the transmitter 22.

In the receiver 23, the reflected wave R is amplified by a gain-variable amplifier 23b, and the band width of the amplified output thereof is limited by a BPF (bandpass filter) 23c. In this way, the interference wave from other communication systems is removed and a receive signal Rr is output to the correlation value detector 26 described later.

Incidentally, an attenuator with the attenuation amount thereof variable can alternatively be used to change the gain in the receiver 23.

Also, the transmission antenna 22a and the receiving antenna 23a may be used for common.

On the other hand, the delay unit 24 receives the trigger pulses Pt output from the trigger pulse generator 21. Each trigger pulse Pt, after being delayed for a predetermined delay time T designated variably, is output to the local pulse generator 25 from the delay time changing unit 30 described later.

On the other hand, the delay unit 24 receives the trigger pulses Pt output from the trigger pulse generator 21. Each trigger pulse Pt, after being delayed for a designated delay time τ, is output to the local pulse generator 25 from the delay time changing unit 30 described later.

This delay unit 24 can be configured by combining delay means 24a for coarse adjustment capable of changing the delay time in large steps (10 nsec, for example) and delay means 24b for fine adjustment capable of changing the delay time finely (0.1 nsec, for example) in each of the large steps.

The local pulse generator 25 generates a local pulse signal L having a predetermined frequency pulse-modulated by the trigger pulses Pt' delayed by the delay unit 24 and outputs the local pulse signal L to the correlation value detector 26.

In this case, the predetermined frequency (carrier frequency) of the local pulse signal L is assumed to be equal to the carrier frequency of the radar wave P emitted by the transmitter 22.

The correlation value detector 26 is for determining the strength correlation value H between the receive signal Rr output from the receiver 23 and the local pulse signal L output from the local pulse generator 25, and in FIG. 1, configured of a multiplication circuit 27 and an integration circuit 28.

The multiplication circuit 27, which is configured of a double-balanced mixer, multiplies the receive signal Rr and the local pulse signal L with each other and outputs a resulting product signal B to the integration circuit 28.

The integration circuit 28 integrates the product signal B input from the multiplication circuit 27 for the period of time (1 nsec, for example) during which the trigger pulse Pt' is output from the delay unit 24.

Figure 2:
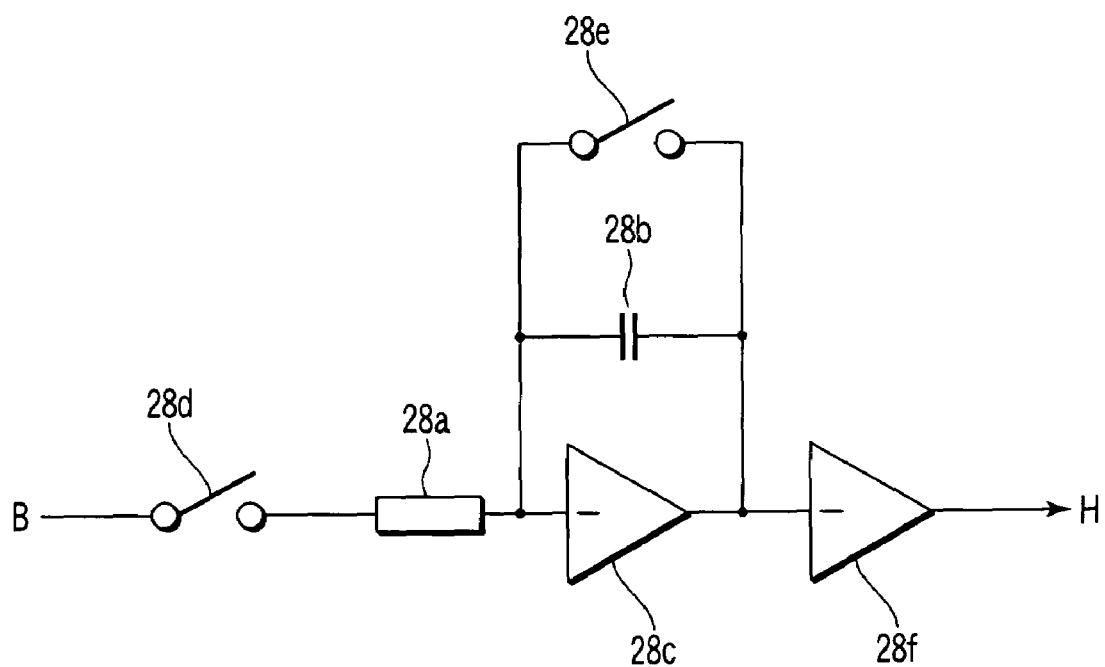
FIG. 2 is a block diagram showing an example of the configuration of the essential parts shown in FIG. 1.

As shown in FIG. 2, for example, this integration circuit 28 comprises a Miller integration circuit configured of a resistor 28a, a capacitor 28b, an inverting amplifier 28c, a charging switch 28d, a discharging switch 28e and an inverting amplifier 28f for inverting the output polarity.

In the integration circuit 28 having this configuration, the charging switch 28d is closed to integrate the product signal B only during the time when the trigger pulse Pt' is input from the delay unit 24. After complete input of the trigger pulse Pt', the charging switch 28d is opened to hold the result of integration and the value thus held with the polarity thereof inverted is output as a strength correlation value H.

At an arbitrary timing before the next trigger pulse Pt' is input, the integration circuit 28 temporarily closes the discharging switch 28e and thus discharges the capacitor 28b in preparation for the integration of the next trigger pulse Pt'.

This integration circuit 28 is not limited to the configuration described above, but by omitting the charging switch 28d, for example, may alternatively be so configured that the result of integration is held by sampling in the analog/digital (A/D) converter 29 described later immediately before the end of the input period of the trigger pulse Pt'.

In the process, the discharging switch 28e of the integration circuit 28 may be kept closed before the trigger pulse Pt' is input.

The strength correlation value H held by the correlation value detector 26 is converted to a digital value by the A/D converter 29 before discharge, and stored with a corresponding delay time τ in the correlation value storage unit 31 described later.

The delay time changing unit 30, on the other hand, sequentially changes the predetermined delay time T of the delay unit 24 each time the trigger pulse is generated during the period T when the trigger pulses Pt are generated.

The changing mode of this delay time τ is designated by the search control unit 35 described later. In the case where the coarse search mode is designated, for example, the timing of the trigger pulse Pr delayed by the width W thereof, i.e. τ=W is set as an initial value, from which the delay time τ is increased by Δτ each time the trigger pulse Pt is output. After changing the delay time τ to T−Δτ in this way, the delay time is returned to τ=W. This process is repeated.

The change width Δτ for the coarse search mode is set to about a value which is not less than the minimum changing step of the delay time in the delay unit 24 and at which the presence or absence of an object in the intended search space is recognizable (0.4 nsec, for example).

In the case where the fine search mode within a predetermined delay time range is designated by the search control unit 35, on the other hand, the delay time is changed with a smaller change width Δτ (0.1 nsec, for example) within the particular range.

The strength correlation value H converted into a digital value by the A/D converter 29 is stored in the correlation value storage unit 31 with a corresponding delay time T associated with the time when a particular strength correlation value H is obtained.

Figure 10:
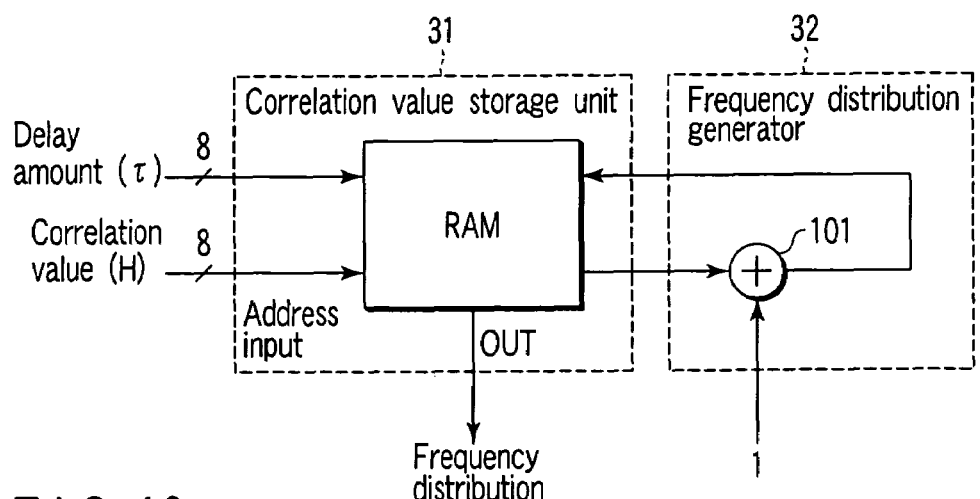
FIG. 10 is a block diagram for explaining a specific example of the correlation value storage unit and the frequency distribution generator of the radar device shown in FIG. 1.

More specifically, as shown in FIG. 10, the strength correlation value H is stored in a memory (RAM) 100 of the correlation value storage unit 31, for example, in such a manner that on the assumption that the memory (RAM) 100 has an address space corresponding to the variable width (a delay amount expressed in 8 bits, for example) of the delay time τ and the strength correlation value H (an input value expressed in 8 bits, for example) converted into a digital value, an address corresponding to the delay time τ and the digital strength correlation value H is designated in the memory (RAM) so that the strength correlation value H is stored at the particular address.

The frequency distribution generator 32 generates a frequency distribution of the strength correlation value H with respect to the delay time τ based on the strength correlation value H stored in the correlation value storage unit 31.

In this case, the frequency distribution generator 32 and the correlation value storage unit 31 are configured in a manner correlated to each other as shown in the specific example of FIG. 10 described later, and the frequency distribution of the strength correlation value H can be generated using, for example, the cross-over value distribution measuring technique as disclosed in Patent Document 1, the amplitude probability distribution measuring technique as disclosed in Patent Document 2 or the time width distribution measuring technique as disclosed in Patent Document 2.

Patent Document 1: Japanese Patent No. 2899879
Patent Document 2: Japanese Patent No. 3156152
Patent Document 3: Japanese Patent No. 2920828

The distribution measuring techniques disclosed in these Patent Documents 1 to 3 are developed by the present inventor and others.

More specifically, the frequency distribution generator 32 can generate the frequency distribution of the strength correlation value H against the delay time τ based on the correlation value H stored in the memory (RAM) 100 of the correlation value storage unit 31 in such a manner that a +1 adder 101 connected to the memory (RAM) 100 of the correlation value storage unit 31 as shown in FIG. 10, for example, adds 1 to the strength correlation value H stored in the memory (RAM) 100, and the result of addition is stored again in the memory (RAM) 100 while at the same time updating the strength correlation value H upward by unity.

Incidentally, in the case where the gain of the receiver 23 is variably controlled by being changed in accordance with the delay time τ as described later, the strength correlation value H detected by the correlation value detector 26 changes with the gain of the receiver 23. Therefore, the gain change of the receiver 23 with respect to the detected strength correlation value H is corrected so that the correlation value corresponding to the strength of the reflected wave R is determined thereby to generate the frequency distribution.

Also, the gain changing unit 33 controls by changing the receiving gain of the receiver 23 with respect to the receive signal Rr, i.e. the gain of the amplifier 23b in accordance with the delay time τ changed by the delay time changing unit 30.

This gain change operation is performed in such a manner that the gain of the amplifier 23b is reduced more, the smaller the delay time τ thereby to stabilize the level of the receive signal Rr output from the receiver 23.

The delay time τ is proportional to the distance, and the input strength of the receive signal Rr is inversely proportional to the fourth power of the distance. In the case where the delay time τ is changed downward to ½, for example, the gain of the amplifier 23b is reduced to 1/16 in advance. By doing so, a sharp and large level change of the receive signal Rr can be positively suppressed, and a signal of an excessively large level is prevented from being input to the correlation value detector 26.

The search control unit 35, based on the frequency distribution generated by the frequency distribution generator 32, analyzes the intended search space by determining whether the object 1 is present or absent in the intended search space, detecting the distance to the object 1 and the direction in which the object 1 moves and giving an instruction to change the mode of the delay time changing unit 30, while at the same time aurally announcing the information obtained by the analysis.

Next, the operation of the radar device 20 having the above-mentioned configuration is explained.

Figure 3A:
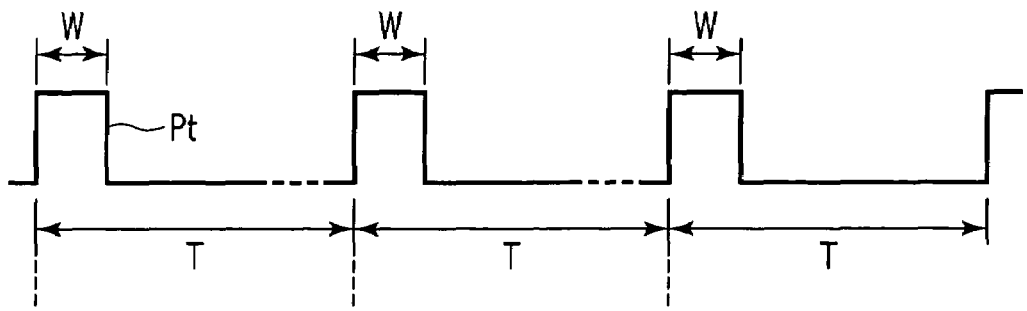
FIG. 3A is a signal waveform diagram showing the trigger pulses Pt generated by a trigger pulse generator to explain the operation of the radar device of FIG. 1.
Figure 3B:
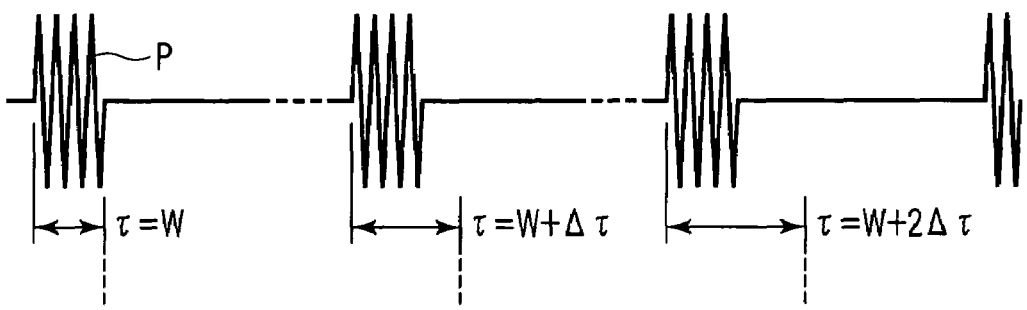
FIG. 3B is a signal waveform diagram showing a radar wave P output by a transmitter to explain the operation of the radar device of FIG. 1.

After the trigger pulse Pt having a width W is output at the period T as shown in FIG. 3A from the trigger pulse generator 21 to the transmitter 22 and the delay unit 24, the radar wave P pulse-modulated by the trigger pulse Pt is emitted from the transmitter 22 into the intended search space as shown in FIG. 3B.

Figure 3C:
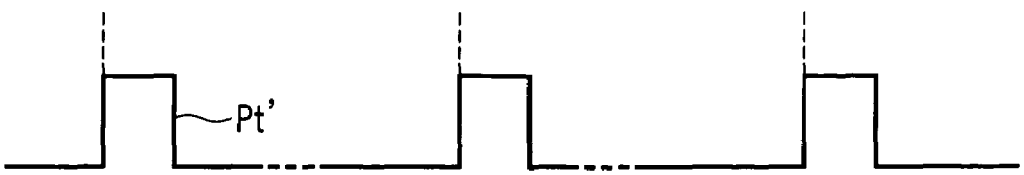
FIG. 3C is a signal waveform diagram showing the trigger pulses Pt' delayed by a delay unit to explain the operation of the radar device of FIG. 1.

Also, from the delay unit 24, the trigger pulses Pt' each delayed by a predetermined step Δτ, i.e. τ=W, W+Δτ, W+2·Δτ, W+3·Δτ and so forth are output as shown in FIG. 3C.

From the local pulse generator 25 that has received the trigger pulse Pt', as shown in FIG. 3D, the local pulse signal L having a predetermined frequency pulse-modulated by the trigger pulse Pt' as described above is output.

The radar wave P emitted by the transmitter 22, on the other hand, is reflected on the object 1 in the intended search space, and a part thereof enters the receiver 23 as a reflected wave R as shown in FIG. 3E, while the receive signal Rr corresponding to the reflected wave R is output as shown in FIG. 3F.

In the initial stages where the delay time $\tau$ is small, the gain of the receiver 23 is set to a very low value, and therefore the level of the receive signal Rr output from the receiver 23 is low.

The receive signal Rr and the local pulse signal L are input to the correlation value detector 26 and the strength correlation value H thereof is detected. In the initial stages where the object 1 in the intended search space is located at a comparatively distant position, as shown in FIGS. 3A to 3G, the input period of the receive signal Rr fails to coincide with the input period of the local pulse signal L, and the product thereof is zero. Therefore, as shown in FIG. 3G, the strength correlation value $H(i, j)$ is zero (in this case, assuming that the system is not affected by noise or the like).

Incidentally, the suffix i of the strength correlation value $H(i, j)$ indicates the number of times the search is conducted as expressed in units each representing the sequential change of the delay time $\tau$ from the initial value W to the final value $(T-\Delta\tau)$, while the suffix j indicates the number of times the radar wave P is output during one search session.

Figure 4A:
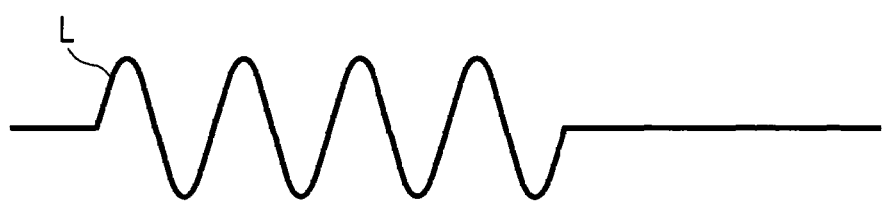
FIG. 4A is a waveform diagram showing the kth local pulse signal L generated by the local pulse generator to explain the operation of the correlation value detector of the radar device of FIG. 1.
Figure 4B:
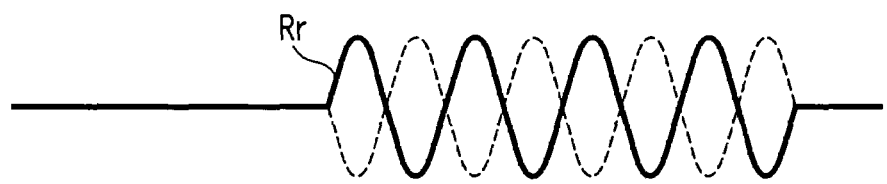
FIG. 4B is a waveform diagram showing a receive signal Rr from the receiver corresponding to the kth local pulse signal L generated by the local pulse generator to explain the operation of the correlation value detector of the radar device of FIG. 1.
Figure 4C:
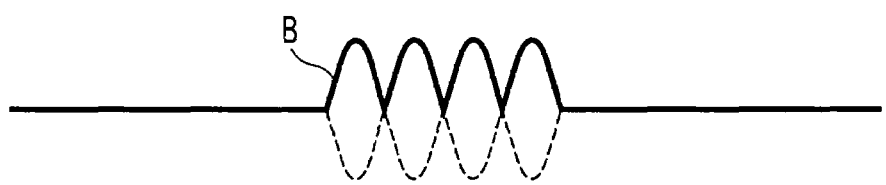
FIG. 4C is a waveform diagram showing a multiplication signal B output by a multiplication circuit corresponding to the kth local pulse signal L generated by the local pulse generator to explain the operation of the correlation value detector of the radar device of FIG. 1.

In the case where the delay time $\tau$ increases with respect to the trigger pulse Pt to such an extent that as shown in FIG. 4B, the front portion of the input period of the receive signal Rr is superposed on the input period of the kth local pulse signal L shown in FIG. 4A and both signals are in phase with each other, then the product signal B output from the multiplication circuit 27 of the correlation value detector 26 assumes a positive fully rectified waveform as shown in FIG. 4C.

Figure 4D:
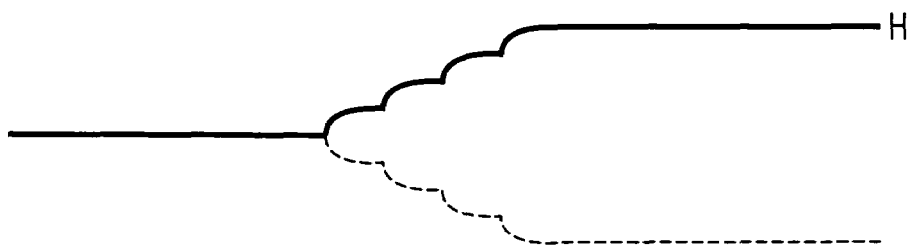
FIG. 4D is a waveform diagram showing a strength correlation value H based on the result of integration by an integration circuit corresponding to the kth local pulse signal L generated by the local pulse generator to explain the operation of the correlation value detector of the radar device of FIG. 1.

The result of integration by the integration circuit 28 of the correlation value detector 26, as shown in FIG. 4D, monotonically increases in steps until the end of the superposed period, and the integration result as of the end of the superposed period is held.

The value thus held is stored as a strength correlation value $H(1, k)$ through the A/D converter 29 in the correlation value storage unit 31 with a corresponding delay time $\tau=W+(k-1)\Delta\tau$.

In this case, the strength correlation value $H(1, k)$ is proportional to the ratio of superposition of the input periods between the local pulse signal L and the receive signal Rr.

Figure 5A:
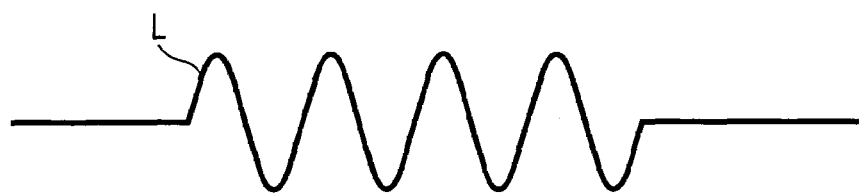
FIG. 5A is a waveform diagram showing the (k+a)-th local pulse signal L generated by the local pulse generator to explain the operation of the correlation value detector of the radar device of FIG. 1.
Figure 5B:
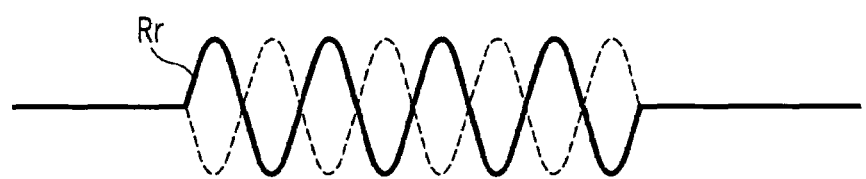
FIG. 5B is a waveform diagram showing the receive signal Rr from the receiver corresponding to the (k+a)-th local pulse signal L generated by the local pulse generator to explain the operation of the correlation value detector of the radar device of FIG. 1.
Figure 5C:
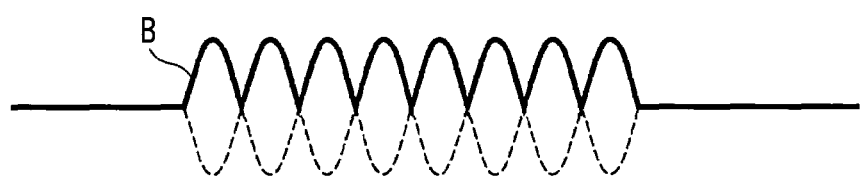
FIG. 5C is a waveform diagram showing a multiplication signal B output by the multiplication circuit corresponding to the (k+a)-th local pulse signal L generated by the local pulse generator to explain the operation of the correlation value detector of the radar device of FIG. 1.

In the case where the delay time $\tau$ with respect to the trigger pulse Pt further increases to such an extent that as shown in FIG. 5B, the input period of the receive signal Rr is superposed substantially entirely on the input period of the (k+a)-th local pulse signal L shown in FIG. 5A and both signals are in phase with each other, then the product signal B output from the multiplication circuit 27 of the correlation value detector 26 assumes a positive full rectified waveform as shown in FIG. 5C.

Figure 5D:
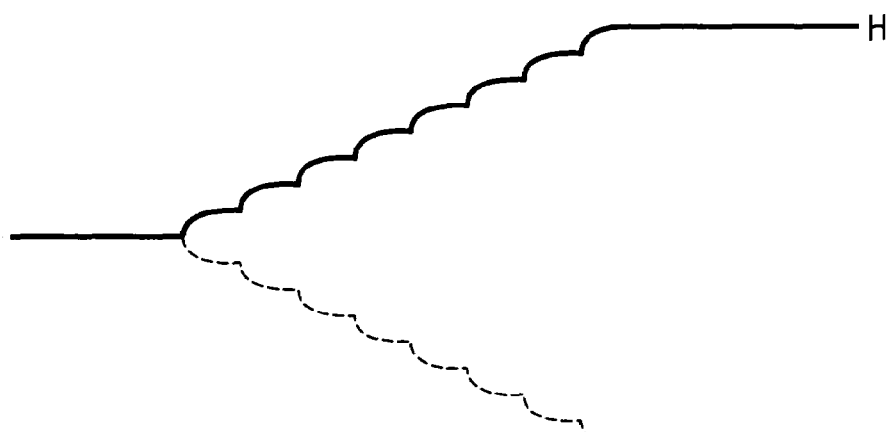
FIG. 5D is a waveform diagram showing a strength correlation value H based on the result of integration by an integration circuit corresponding to the (k+a)-th local pulse signal L generated by the local pulse generator to explain the operation of the correlation value detector of the radar device of FIG. 1.

The result of integration by the integration circuit 28 of the correlation value detector 26, as shown in FIG. 5D, monotonically increases in steps until the end of the superposed period, and the integration result as of the end of the superposed period is held.

The value thus held is stored with a corresponding delay time $\tau=W+(k+a-1)\Delta\tau$.

This strength correlation value $H(1, k+a)$ assumes a still larger value (maximum value) than the strength correlation value $H(1, k)$ described above since the superposed period of the two signals is longer.

Figure 6A:
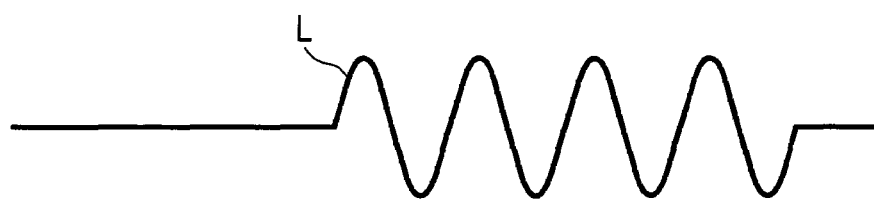
FIG. 6A is a waveform diagram showing the (k+b)-th (b>a) local pulse signal L generated by the local pulse generator to explain the operation of the correlation value detector of the radar device of FIG. 1.
Figure 6B:
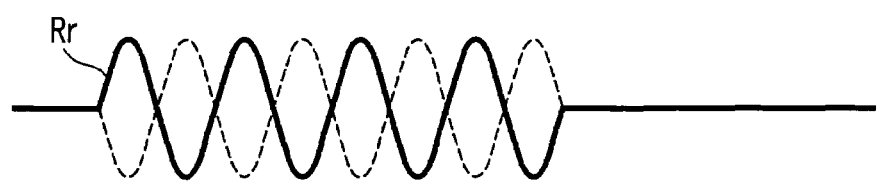
FIG. 6B is a waveform diagram showing the receive signal Rr from the receiver corresponding to the (k+b)-th local pulse signal L generated by the local pulse generator to explain the operation of the correlation value detector of the radar device of FIG. 1.
Figure 6C:
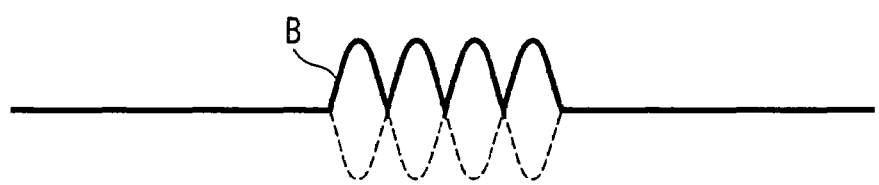
FIG. 6C is a waveform diagram showing a multiplication signal B output by the multiplication circuit corresponding to the (k+b)-th local pulse signal L generated by the local pulse generator to explain the operation of the correlation value detector of the radar device of FIG. 1.

In the case where the delay time $\tau$ with respect to the trigger pulse Pt further increases to such an extent that as shown in FIG. 6B, the rear portion of the input period of the receive signal Rr is superposed on the input period of the (k+b)-th (b>a) local pulse signal L shown in FIG. 6A and both signals are in phase with each other, then the product signal B output from the multiplication circuit 27 of the correlation value detector 26 assumes a positive fully rectified waveform as shown in FIG. 6C.

Figure 6D:
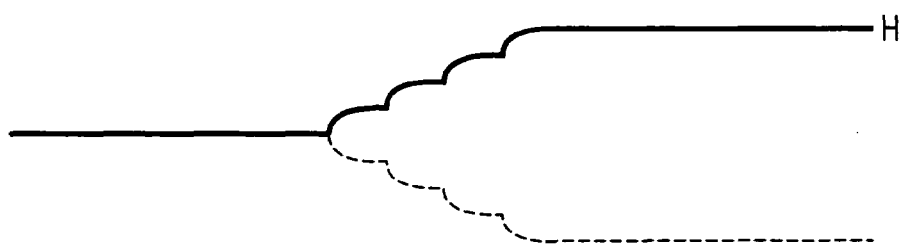
FIG. 6D is a waveform diagram showing a strength correlation value H based on the result of integration by an integration circuit corresponding to the (k+b)-th local pulse signal L generated by the local pulse generator to explain the operation of the correlation value detector of the radar device of FIG. 1.

The result of integration by the integration circuit 28 of the correlation value detector 26, as shown in FIG. 6D, monotonically increases in steps until the end of the superposed period, and the integration result as of the end of the superposed period is held.

The value thus held is converted into a strength correlation value $H(1, k+b)$ through the A/D converter 29, and stored with a corresponding delay time $\tau=W+(k+b-1)\Delta\tau$ (b>a) in the correlation storage unit 31.

This strength correlation value $H(1, k+b)$ assumes a smaller value than the correlation value $H(1, k+a)$ described above since the superposed period of the two signals is shorter.

Incidentally, in the case where the phase of the receive signal Rr is inverted to that of the local pulse signal L as shown by dotted line in FIGS. 4B, 5B and 6B, the result of multiplication in the correlation value detector 26 assumes a negative fully rectified waveform as shown by dotted line in FIGS. 4C, 5C and 6C.

The result of integration in the correlation value detector 26 monotonically decreases until the end of the superposed period as shown by dotted line in FIGS. 4D, 5D and 6D, although the relation between the superposed period and the strength correlation value H in terms of absolute value remains the same as in the case where the local pulse signal L and the receive signal Rr are in phase with each other.

In the case where the receive signal Rr is 90 degrees out of phase with the local pulse signal L, on the other hand, the multiplication result is oscillated sinusoidally around zero and the integration value alternates between increase and decrease. Thus, the strength correlation value $H(i, j)$ assumes a very small value.

In this way, the delay time $\tau$ changes sequentially from the initial value W to the final value $(T-\Delta\tau)$, so that the strength correlation values $H(1, 1), H(1, 2), \ldots, H(1, M)$ are obtained for each delay time.

Thereafter, the delay time changing unit 30 changes the delay time $\tau$ again sequentially from the initial value W to the final value $(T-\Delta\tau)$ for the second search session, and the resulting strength correlation values $H(2, 1), H(2, 2), \ldots, H(2, M)$ are stored with the corresponding delay time $\tau$ (where M is the quotient of dividing $(T-\tau)$ by the width W of the trigger pulse Pt).

The phase relation between the two signals during the superposed period changes considerably with a slight change of the distance between the person or the vehicle carrying the radar device 20 and the object in the intended search space. Among the strength correlation values $H(2, 1), H(2, 2), \ldots, H(2, M)$ obtained in the second search session, therefore, the strength correlation value H during and in the neighborhood of the superposed period is inverted to the positive or negative side or changes considerably in absolute value as compared with the first search session.

A similar search operation is repeated a predetermined number of times Q (100 times, for example) to obtain M·Q pieces of the strength correlation values $H(1, M), H(2, M), \ldots, H(Q, M)$. Then, the frequency distribution generator 32 executes the process of generating the frequency distribution.

In this frequency distribution generating process executed by the frequency distribution generator 32, each strength correlation value H(i, j) is classified, for example, into a total of 11 stages including five positive stages, five negative stages, and zero. Thus, the frequency distribution indicating the frequency of occurrence of each stage is generated for each delay time τ as shown in FIG. 7.

Figure 7:
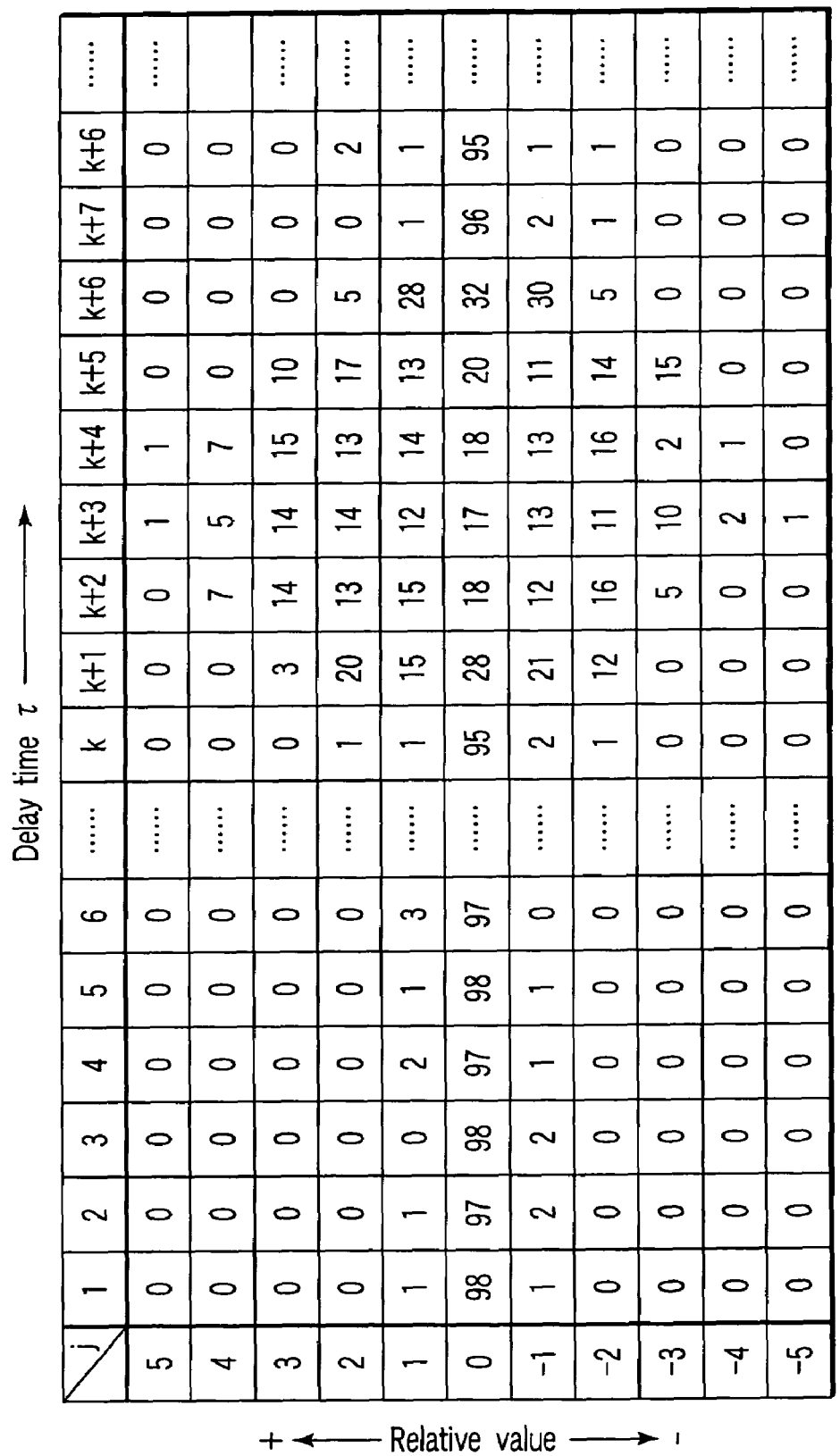
FIG. 7 is a diagram showing an example of the frequency distribution generated by a frequency distribution generator to explain the operation of the radar device of FIG. 1.

In the frequency distribution shown in FIG. 7, the frequency of occurrence varies from one stage to another during and in the neighborhood (neighborhood of j=k+3) of the time zone during which the input period of the local pulse signal L in phase with the delayed trigger pulse Pt' and the input period of the receive signal Rr are superposed one on the other. It can then be determined stochastically that this variation width reaches the maximum when the input period of the local pulse signal L and the input period of the receive signal Rr are substantially completely superposed one on the other.

The search control unit 35, based on this frequency distribution, checks the presence or absence of an object and the distance thereof in the intended search space, and announces the result thereof. At the same time, in order to make a more detailed search for objects in the search space, as required, the change mode of the delay time τ of the delay time changing unit 30 is switched to the fine search mode, and the frequency distribution obtained by this search is further analyzed.

For example, the search control unit 35 conducts the sum-of-products operation of the positive stage value of the frequency distribution and the number of times of occurrence thereof for each delay time, and from the delay time τ' associated with the maximum value of the sum-of-products operation, the distance to the object in the intended search space is determined.

Specifically, let v be the velocity of the radio wave and D the distance to the object in the intended search space. The distance D can be determined as $$D = v \tau'/2$$

Also, as described above, the gain of the receiver 22 is changed in accordance with the delay time τ to suppress a large level change of the receive signal with the difference in the distance to the object in the intended search space. The level difference of the receive signal Rr, therefore, is dependent mainly on the reflectivity (material, size and shape) of the object 1 against the radar wave P in the intended search space.

The level change of the receive signal Rr with the difference in reflectivity presents itself as the magnitude of the variation of the strength correlation value H. From this magnitude of the variation, therefore, the search control unit 35 can roughly determine whether the object in the intended search space is composed of a material such as a metal high in reflectivity (high in hazard degree) or a person, an animal or a tree low in reflectivity (low in hazard degree). In this way, the type of alarm can be changed in accordance with the result of determination.

As explained above, in the radar device 20 according to an embodiment of the invention, the local pulse signal L modulated by the trigger pulse Pt' delayed by the delay unit 24 is multiplied by the receive signal Rr obtained by receiving the reflected wave R, and the result of multiplication is integrated to determine the strength correlation value H between the two signals. At the same time, by changing the delay time of the delay unit 24 sequentially, the strength correlation value is determined for each delay time. Further, the frequency distribution of the strength correlation value against the delay time is determined, and based on this frequency distribution, the intended search space is analyzed.

As a result, the radar device 20 according to the embodiment of the invention is capable of detecting the strength of the reflected radar wave having a narrow width that cannot be detected by the diode detection circuit of the conventional radar device. Thus, the short-range search can be conducted with a high resolution, thereby making it possible to implement a short-range radar device for on-vehicle application or blind persons.

Also, the radar device 20 according to the embodiment of the invention controls the gain of the receiver 22 in accordance with the delay time in advance. Even in the case where the search range is short in distance, therefore, the level change of the receive signal due to a sharp and large change of the reflected wave which otherwise might occur can be positively suppressed, and the strength correlation value can be detected accurately within an appropriate operation range.

According to the embodiment described above, the frequency distribution is generated for the strength correlation value H of both positive and negative polarities detected by the correlation value detector 26. The frequency distribution may alternatively be generated, however, by converting the result of integration into an absolute value and determining the converted absolute value as a correlation value.

In the case where the mixer making up the multiplication circuit 27 involves a DC offset, however, the aforementioned simple process of conversion to an absolute value might make impossible accurate detection of the correlation value under the direct effect of the DC offset.

Figure 8:
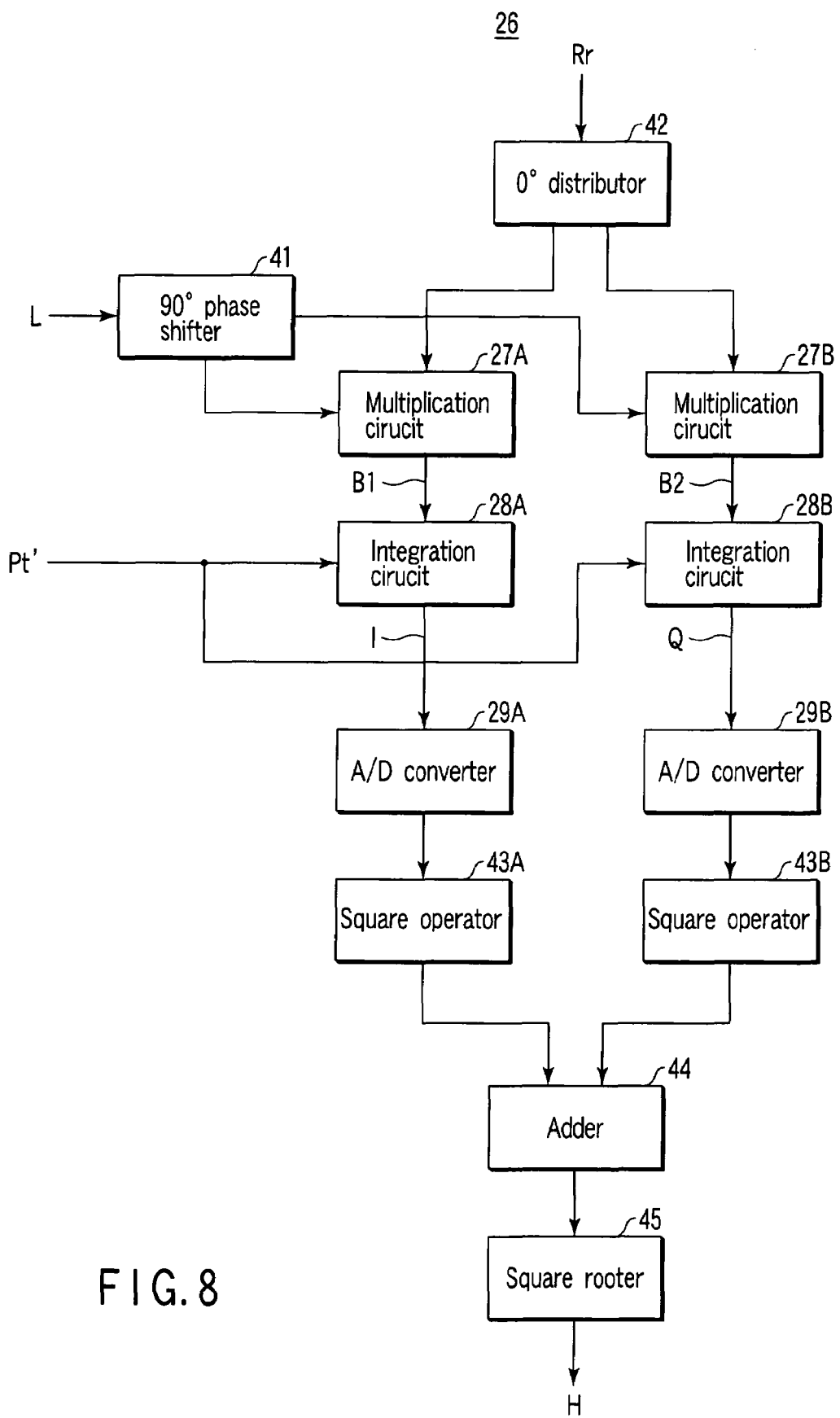
FIG. 8 is a block diagram showing the correlation value detector as a configuration of the essential parts of the radar device according to another embodiment of the invention.
Figure 9:
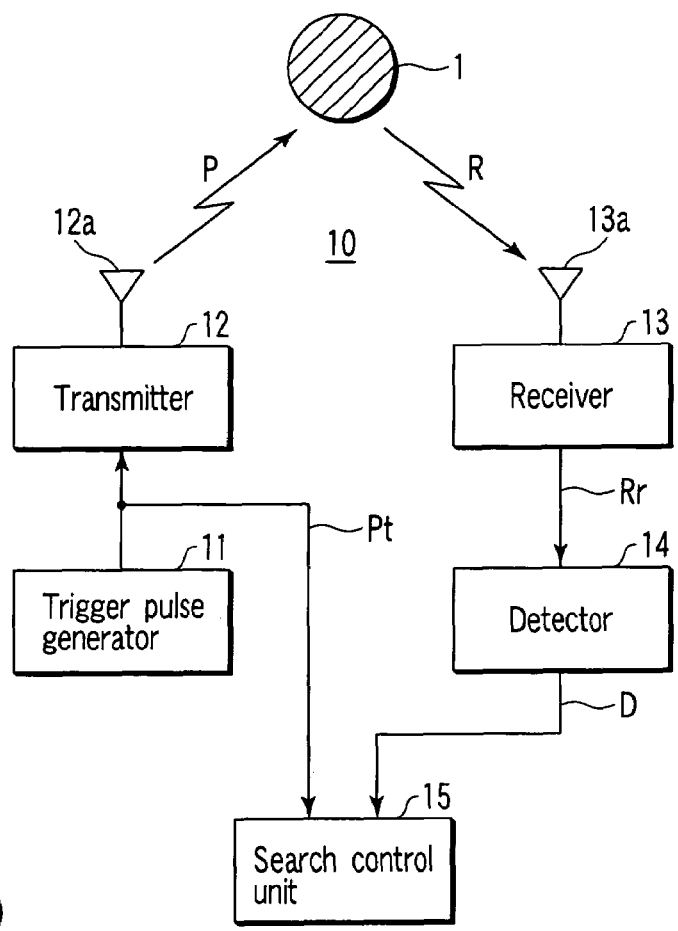
FIG. 9 is a block diagram showing a configuration of the conventional radar device.

In the case where the effect of the DC offset is a problem, the correlation value detector 26 of orthogonal detection type is employed as shown in FIG. 8.

Specifically, the correlation value detector 26 of orthogonal detection type includes a 90-degree phase shifter 41 to divide the local pulse signal output from the local pulse generator 25 into two signals having 90 degrees of phase difference with each other, a 0-degree distributor 42 to divide the receive signal output from the receiver 23 into two signals in phase, first and second multiplication circuits 27A, 27B in which the local pulse signal divided into two signals having 90 degrees of phase difference each other by the phase 90-degree shifter 41 are multiplied with the receive signal divided into two signals of equal phase by the 0-degree distributor 42, respectively, first and second integration circuits 28A, 28B to integrate the multiplication outputs from the first and second multiplication circuits 27A, 27B, respectively, first and second A/D converters 29A, 29B to convert the integration outputs from the first and second integration circuits 28A, 28B, respectively, from analog to digital signal (A/D conversion), first and second square operators 43A, 43B to square digital signals converted by the first and second A/D converters 29A, 29B, respectively, and an adder 44 to add square operation results from the first and second square operators 43A, 43B and output a result of addition as the strength correlation value.

In this case, the correlation value storage unit 31 stores the result of addition output as the strength correlation value from the adder 44.

Specifically, in the correlation value detector 26 shown in FIG. 8, after the local pulse signal L is divided into two signals having 90 degrees of phase difference each other by the 90-degree phase shifter 41, as in the case of FIG. 1, the two signals are input to the multiplication circuits 27A, 27B, respectively, each configured of a double-balanced mixer.

Also, the receive signal Rr, after being divided into two signals in phase by the 0-degree distributor 42, is input to the multiplication circuits 27A, 28B, respectively.

As in the case of FIG. 1, a multiplication output B1 from the multiplication circuit 27A is integrated by the integration circuit 28A and the integration output thereof is held.

Next, the value I thus held, after being converted into a digital value by the A/D converter 29A, is squared by the square operator 43A.

Also, a multiplication output B2 from the multiplication circuit 27B is integrated by the integration circuit 28B, and the integration output thereof is held.

Next, the value Q thus held, after being converted into a digital value by the A/D converter 29B, is squared by the square operator 43B.

The square operation results of the held values I and Q are added to each other by the adder 44, after which the square root of the sum is determined by a square rooter 45 and output as a strength correlation value H.

The correlation value detector 26 of orthogonal detection type determines, as a strength correlation value H, the effective power of the signal having the held values I, Q as orthogonal components. Thus, though detailed arithmetic operation is not described, an accurate strength correlation value H having positive polarity which is canceled the DC offset of each multiplication circuit can be obtained.

Incidentally, the square rooter 45 of the correlation value detector 26 shown in FIG. 8 may be omitted, and the output of the adder 44 may be employed as a strength correlation value H.

Although the trigger pulse Pt has a predetermined width W in the embodiment described above, the system can alternatively be configured in such a manner that the larger the delay time τ, the larger the width W of the trigger pulse Pt output from the trigger pulse generator 21. By doing so, a large strength correlation value can be obtained against the reflected wave from a far end and the search with a high S/N is made possible.

In this case, in accordance with the delay time τ designated by the delay time changing unit 30, the trigger pulse generating unit 21 changes the width W of the trigger pulse Pt continuously or in steps. The strength correlation value thus obtained is corrected by the frequency distribution generating unit 32 allowing for the change in pulse width. In this way, the strength correlation value is determined based on the assumption that the pulse of the same width is used, thereby generating a frequency distribution.

According to this invention, therefore, the problem of the prior art is solved, and a radar device capable of correctly searching the surrounding environment with a high resolution is provided.

INDUSTRIAL APPLICABILITY

The radar device according to the invention, having the technical effect that the surrounding environment can be correctly searched with a high resolution, can find various applications for on-vehicle use, blind persons and medical purposes.

The invention claimed is:

1. A radar device comprising:
a trigger pulse generator which generates a trigger pulse of a predetermined width at a predetermined period;
a transmitter which emits into an intended search space a radar wave having a predetermined frequency pulse-modulated by the trigger pulse from the trigger pulse generator;
a receiver which receives a reflected wave of the radar wave emitted by the transmitter and outputs a receive signal;
a delay unit which delays the trigger pulse from the trigger pulse generator by a predetermined delay time;
a local pulse generator which outputs a local pulse signal having the predetermined frequency pulse-modulated by the trigger pulse delayed by the predetermined delay time by the delay unit;
a correlation value detector which determines a strength correlation value between the receive signal output from the receiver and the local pulse signal output from the local pulse generator;
a delay time changing unit which sequentially changes the predetermined delay time of the delay unit within a range of the predetermined period representing a generation period of the trigger pulse generated by the trigger pulse generator;
a correlation value storage unit which stores the strength correlation value detected by the correlation value detector for each delay time changed by the delay time changing unit;
a frequency distribution generator which generates a frequency distribution of the strength correlation value stored in the correlation value storage unit with respect to the delay time; and
a search control unit which executes an analyzation for the intended search space based on the frequency distribution generated by the frequency distribution generator.

2. A radar device according to claim 1,
wherein the receiver is configured to change a receiving gain against the reflected wave,
the radar device further comprising a gain changing unit which variably controls the receiving gain of the receiver in accordance with the delay time changed by the delay time changing unit and suppresses a change in an output level of the receive signal due to a difference in the delay time.

3. A radar device according to claim 1,
wherein the correction value detector comprises:
a multiplication circuit which multiplies the receive signal output from the receiver by the local pulse signal output from the local pulse generator, and
an integration circuit which integrates a multiplication output from the multiplication circuit.

4. A radar device according to claim 3, further comprising an analog-to-digital (A/D) converter which converts an integration output from the integration circuit from an analog to a digital signal,
wherein the correlation value storage unit stores the digital signal converted by the A/D converter as the strength correlation value.

5. A radar device according to claim 3,
wherein the integration circuit comprises a Miller integrator.

6. A radar device according to claim 1,
wherein the correlation value detector comprises:
a 90-degree phase shifter which divides the local pulse signal output from the local pulse generator into two signals having 90 degrees of phase difference each other,
a 0-degree distributor which divides the receive signal output from the receiver into two signals in phase with each other,
first and second multiplication circuits which each multiplys the local pulse signal divided into the two signals having 90 degrees of phase difference each other by the 90-degree phase shifter, respectively, with the receive signal divided into the two signals in phase with each other by the 0-degree distributor, first and second integration circuits which each integrates the multiplication outputs from the first and second multiplication circuits, respectively, first and second A/D converters which each converts integration outputs from the first and second integration circuits, respectively, from an analog to a digital signal, first and second square operators which each squares digital signals converted by the first and second A/D converters, respectively, and an adder which adds square operation results from the first and second square operators and outputs a result of addition as the strength correlation value, and the correlation value storage unit stores the result of addition output as the strength correlation value from the adder.

7. A radar device according to claim 6, wherein the correlation value detector further comprises a square rooter which determines a square root of the result of addition from the adder and outputs the square root as the strength correlation value, and the correlation value storage unit stores the square root output as the strength correlation value from the square rooter.

8. A radar device according to claim 1, wherein the trigger pulse generator generates a trigger pulse Pt having the predetermined width W of about 1 nsec for about 100 nsec at the predetermined period T and outputs the trigger pulse Pt to the transmitter and the delay unit.

9. A radar device according to claim 8, wherein the transmitter generates a radar wave of UWB (Ultra Wide Band) of 6 to 7 GHz in the frequency range of 23 to 29 GHz as a radar wave having the predetermined frequency pulse-modulated by the trigger pulse.

10. A radar device according to claim 1, wherein the receiver comprises:

a variable-gain amplifier which receives and amplifies a reflected wave from an object which is received the radar wave emitted by the transmitter into the intended search space, and a bandpass filter (BPF) which limits the band of an amplified output from the variable-gain amplifier and outputs as the receive signal to the correlation value detector.

11. A radar device according to claim 1, wherein the delay unit is configured as a combination of delay means for coarse adjustment capable of changing the predetermined delay time in a large step based on a change instruction of the delay time changing unit and delay means for fine adjustment capable of changing the delay time finely in the large step.

12. A radar device according to claim 11, wherein the delay means for coarse adjustment changes the predetermined delay time in steps of about 10 nsec, and the delay means for fine adjustment changes the predetermined delay time in steps of about 0.1 nsec.

13. A radar device according to claim 1, used as a short-range radar device for on-vehicle application.

14. A radar device according to claim 1, used as a short-range radar device for blind persons.

15. A radar device according to claim 1, used as a short-range radar device for medical purposes.

* * * * *